United States Patent [19]

Bingham

[11] Patent Number: 4,819,147
[45] Date of Patent: Apr. 4, 1989

[54] INTEGRATED AC TO DC POWER SUPPLY

[75] Inventor: David Bingham, San Jose, Calif.

[73] Assignee: Maxim Integrated Products, Sunnyvale, Calif.

[21] Appl. No.: 920,904

[22] Filed: Oct. 17, 1986

Related U.S. Application Data

[63] Continuation of Ser. No. 697,271, Jan. 30, 1985, abandoned.

[51] Int. Cl.⁴ .......................................... H02M 7/217
[52] U.S. Cl. ...................... 363/127; 363/89; 363/147
[58] Field of Search .................. 323/223, 224, 266; 363/89, 126, 127, 128, 147

[56] References Cited

U.S. PATENT DOCUMENTS

| | | | |
|---|---|---|---|
| 3,866,063 | 2/1975 | Long | 363/127 |
| 4,172,279 | 10/1979 | Stein | 363/147 |
| 4,271,462 | 6/1981 | Peters | 363/126 |
| 4,276,592 | 6/1981 | Goldman et al. | 363/147 |
| 4,347,561 | 8/1982 | McLellan | 363/127 |
| 4,366,433 | 12/1982 | Imazeki et al. | 363/127 |
| 4,473,757 | 9/1984 | Farago et al. | 363/127 |
| 4,535,203 | 8/1985 | Jenkins et al. | 363/127 |
| 4,700,286 | 10/1987 | Bingham | 363/127 |

Primary Examiner—Patrick R. Salce
Assistant Examiner—Jeffrey Sterrett
Attorney, Agent, or Firm—Blakely, Sokoloff, Taylor & Zafman

[57] ABSTRACT

An integrated off-line AC to DC power supply is disclosed. Alternating current (AC) line voltage is supplied (optionally) to an AC voltage to current converter and then (optionally) to a voltage limiter and rectifier which utilizes both MOS devices and inherent junction devices as either a full or half wave rectifier. The rectifier output is supplied to a series-pass junciton device voltage regulator or a regulator which has pre-set voltage output or user-selectable voltage output.

10 Claims, 3 Drawing Sheets

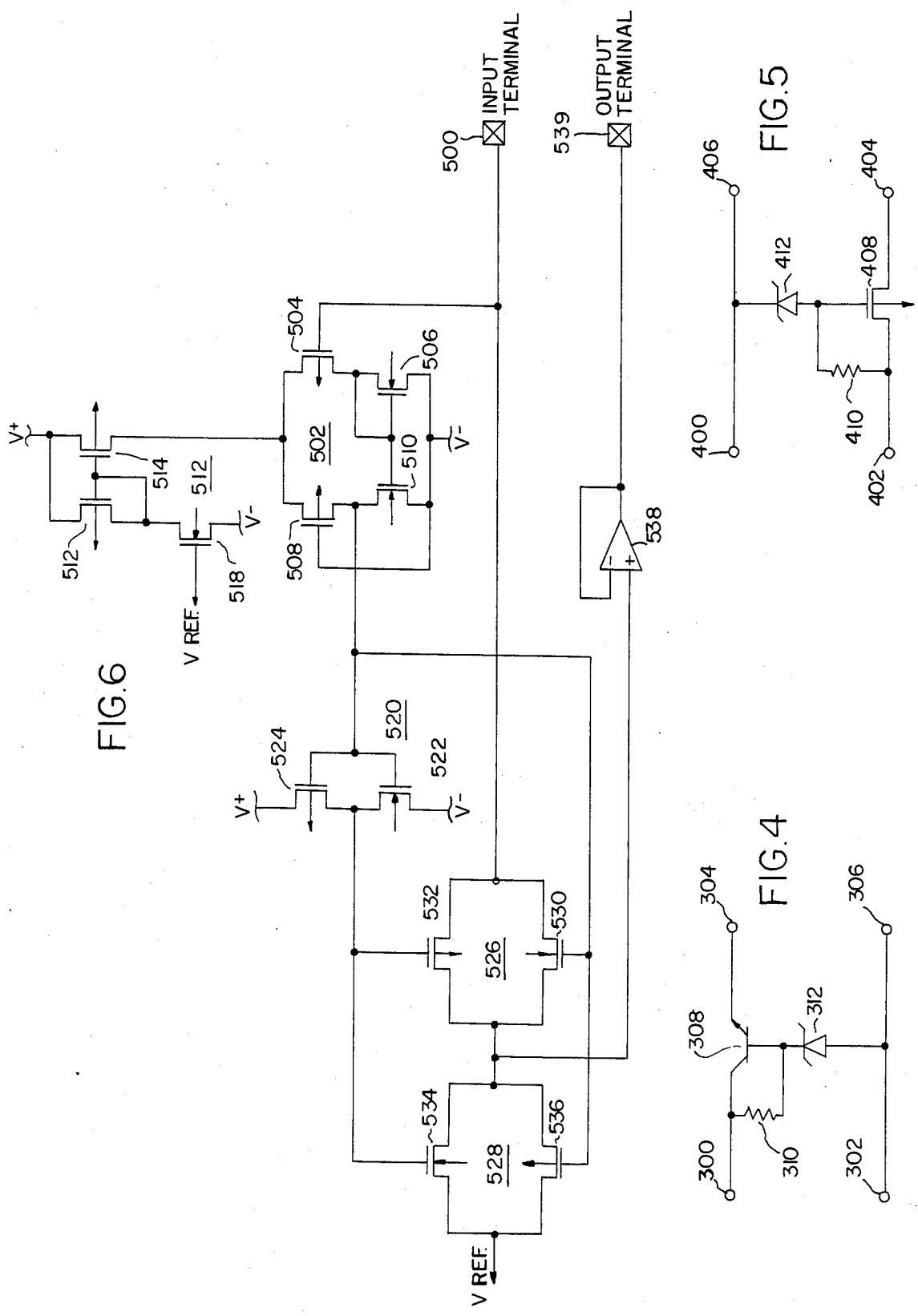

INTEGRATED AC TO DC POWER SUPPLY

This is a continuation of application Ser. No. 697,271, filed Jan. 30, 1985, abandoned.

BACKGROUND OF THE INVENTION

1. Field of the Invention

The present invention is concerned generally with circuit means for converting AC power to DC power, integrated on a single piece of semiconductor material, and having input terminals for connection to a source of AC power and sufficient additional terminals for connection of several discrete external components necessary for the operation of the circuit.

2. The Prior Art

While it is desirable, from a cost standpoint as well as for other reasons, to provide such a power supply circuit which can be integrated on the same piece of semiconductor material as the circuitry which it drives, such a circuit is not currently available. Portions or subblocks of such a circuit, such as diode bridges or other power-supply-oriented diode products, have been assembled and potted into discrete units, and integrated and semi-integrated circuitry has been available for performing voltage and current regulation functions.

The most common of these assemblies is the diode bridge assembly. It consists typically of four discrete P-N diode devices, configured as a full-wave bridge, mounted together with any necessary heat-dissipating members and formed into a rigid structure having four electrical terminals for input and output connections.

The most common integrated circuit power subcircuit is the voltage regulator circuit, having sufficient number of terminals for input and output connections and any necessary external discrete components. Today such circuits are in wide use in the industry.

Among the major shortcomings of the prior art is the failure to incorporate a complete off-line power supply on the same piece of semiconductor material, despite the desirability of such incorporation for the purposes of minimizing cost and assembly time. The provision of such a circuit would enable the integration on a single piece of semiconductor material of both an off-line power supply and the circuitry which it drives.

The integration of rectifier elements on a single piece of semiconductor material has presented technical problems due to the inherent creation of parasitic P-N junction devices which occurs due to the nature of the structure of such elements. The inability to provide such circuits on a single piece of semiconductor material has contributed to increased production costs.

SUMMARY OF THE INVENTION

According to the present invention, there is provided an integrated off-line power supply which includes a rectifier portion and a regulator portion, and which may be fabricated on a single piece of semiconductor material.

The rectifier portion of the circuit of the present invention may be either half-wave type or full-wave type, depending upon current drive requirements and whether or not there is a need for ground isolation between the alternating current source and the circuitry to be driven by the circuit of the present invention. Half-wave and full-wave rectifier circuits suitable for use in the present invention are fully described in my co-pending applications, Ser. Nos. 696,281 and 696,372, Jan. 30, 1985, and assigned to the same assignee as the present invention, which applications are expressly incorporated herein by reference.

The output of the rectifier portion of the circuit is shunted by an external filter capacitor; it is then fed to the input of a voltage regulator portion of the circuit, which may comprise a series-pass transistor having a zener diode driven base, as is well known in the art. The regulator portion may also b as described in co-pending application Ser. No. 697,200, filed Jan. 31, 1985, assigned to the same assignee as the present invention, which application is expressly incorporated herein by reference. Alternatively, the regulator portion may be of other types compatible for integration on a single piece of semiconductor substrate material as the rectifier portions herein.

The output of the off line power supply of the present invention may be used to drive circuitry disposed on the same piece of semiconductor material

OBJECTS, FEATURES AND ADVANTAGES

It is an object of the present invention to solve some of the problems heretofore encountered in integrating an off-line AC to DC power supply on a single piece of semiconductor material.

It is another object of the present invention to provide an off-line AC to DC power supply on the same piece of semiconductor material as the circuitry to which it supplies power.

It is a further object of the present invention to provide an off line AC to DC power supply which can be produced at a low cost.

Yet another object of the present invention is to provide an integrated off line AC to DC power supply which utilizes the inherent junction devices created in MOS processing.

Still other objects, features and attendant advantages of the present invention will become apparent to those of ordinary skill in the art from a reading of the following detailed description in conjunction with the accompanying drawings and appended claims.

BRIEF DESCRIPTION OF THE DRAWINGS

FIG. 4 is a schematic diagram of a preferred embodiment of a positive voltage regulator which may be used as a part of the present invention;

FIG. 5 is a schematic diagram of a preferred embodiment of a negative voltage regulator which may be used as a part of the present invention;

FIG. 6 is a schematic diagram of a preferred embodiment of a combination pre-set or user-selectable voltage regulator used with the present invention;

DETAILED DESCRIPTION OF THE PREFERRED EMBODIMENTS

Figure 1:
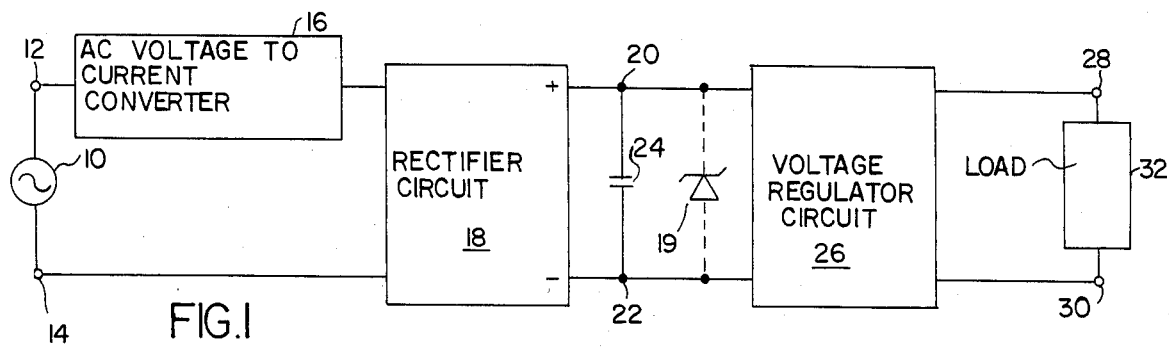
FIG. 1 is a highly simplified block diagram of the circuit subsections of the present invention.

Referring first to FIG. 1, a highly simplified block diagram of circuit subsections of the present invention and their relationships to one another, a source of alternating current 10 is connected to input terminals 12 and 14. For some applications, specifically those where the AC input voltage is much greater than the voltage required at the load, or applications where there is no transformer coupling of the alternating current from the power line to the circuit of the present invention, an AC voltage to AC current converter 16 is placed in series with AC input terminal 12, interposed between AC input terminal 12 and rectifier circuit 18 A single capacitor functions satisfactorily to convert the AC voltage to AC current. This would result in an input voltage of less than 20 volts to the rectifier if a zener diode (shown in dashed lines at 19) having a voltage rating of approximately 14 volts is included.

Zener diode 19 functions as a shunt regulator in an off-line configuration to prevent a high voltage from occurring downstream of the AC voltage to current converter 16. However, when this circuit is used in a non off-line application, e.g., as when the rectifier portion of the circuit is driven from the low voltage secondary of a transformer, no shunt regulator is necessary.

On the positive and the negative output of the rectifier circuit 18 terminals 20 and 22 respectively are provided for provision of an external filter capacitor shown in dotted lines at 24. After the rectifier the rectified and filtered DC is put into voltage regulator circuit 26 At the output of voltage regulator circuit 26, output terminals 28 and 30 provide access to the output of the circuit to be connected to an external load (shown at 32).

In the following discussion with respect to the remaining drawing figures herein, reference will be made to various MOS (metallic oxide semiconductor) transistor devices. In naming the terminals of these devices, certain conventions will be employed herein. Source and drain terminals of these devices are interchangeable and will be named according to the following convention. With respect to N-Channel devices, the most positive of the channel connections at any given time will be called the drain; the most negative of these terminals will be called the source. With respect to P-Channel devices, the opposite will be true.

The N-Channel MOS transistors disclosed herein are enhancement types, which will turn on when gate-to-source voltage is positive and greater than zero. The P-Channel MOS transistors disclosed herein are enhancement types, which will turn on when the gate-to-source voltage is negative and less than zero.

While the presently preferred embodiments of the present invention are disclosed as embodiments employing enhancement mode transistors, those of ordinary skill in the art will recognize and appreciate where depletion type devices will be capable of being used, and accordingly the scope of the present invention is intended to include embodiments constructed using such devices.

Those of ordinary skill in the art will appreciate that the substrates of all N-Channel devices should always be connected to the lowest or most negative voltage in the circuit. Likewise, the substrates of all P-Channel devices should always be connected to the most positive voltage in the circuit.

Figure 2:
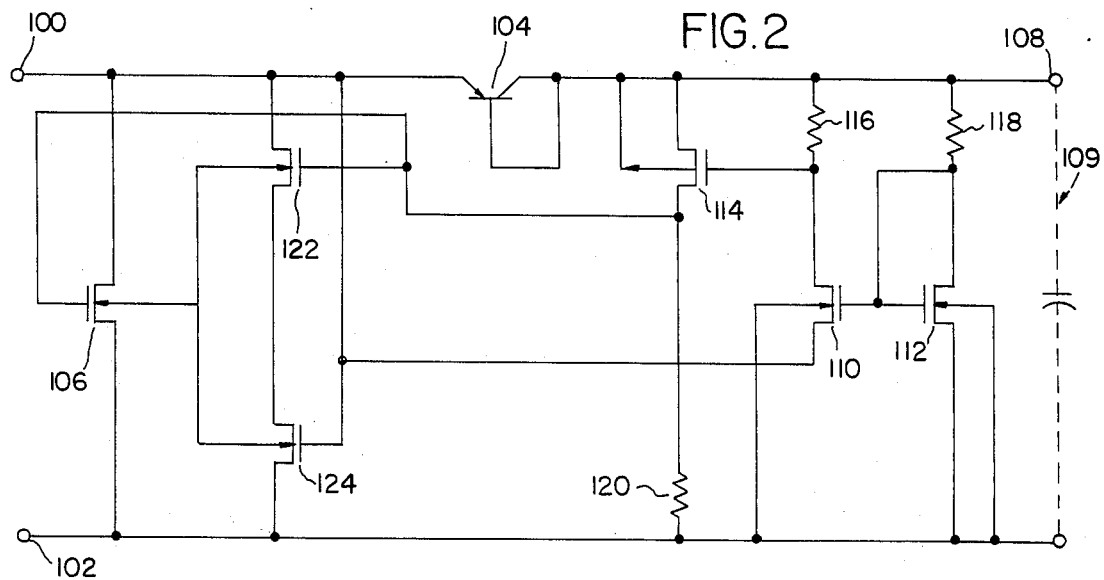
FIG. 2 is a schematic diagram of a preferred embodiment of a half-wave rectifier circuit used in the present invention.

Referring now to FIG. 2, a basic implementation of a preferred embodiment a half-wave rectifier of the present invention is depicted. Attention is also called to application Ser. No. 696,281, filed Jan. 30, 1985, which is incorporated herein by reference.

Input line 100 is connected to the emitter of PNP junction transistor 104 and the collector is connected to line 108, forming the positive output connection of the half-wave rectifier circuit of the present invention. A filter capacitor 109 is shown in dashed lines at the output terminals of the circuit.

Switching device 106 is an N-Channel device. Its gate is driven by the output of a comparator circuit comprising N-Channel devices 110 and 112, P-Channel enhancement device 114, and resistors 116, 118 and 120. N-Channel devices 110 and 112 and resistors 116 and 118 are matched pairs.

The voltages at input lines 100 and 102 are compared at the source of N-Channel device 110. If line 100 is positive with respect to lines 102, N-Channel device 110 will be off since its source, connected to line 100 will be more positive than its gate, connected to line 108 through resistor 118. Likewise, P-Channel device 114 will be off, since its gate-to-source voltage, established by current through resistor 116, will be zero.

N-Channel device 112 is in series with its drain resistor, resistor 118 across the DC output terminals 108 and 102. The gate source turn on voltage for device 112 is approximately 0.5 volts. Once it starts conducting, current through resistor 118 will set its drain-source voltage to about 0.7 volts, which will also establish its gate-source voltage since the gate of N-Channel device 112 is connected to its drain.

The gate of N-Channel device 110 is connected directly to this constant voltage source. As line 102, to which the drain of N-Channel device 110 is connected, varies in voltage, N-Channel devices 110 will turn on and off. When the gate-source voltage of device 110 is 0.7 volts or more, i.e., line 100 is at the same potential or less positive than line 102, N-Channel device 110 will be on. When the voltage on line 102 rises above about 0.2 voltage with respect to line 102, N-Channel device 110 will be completely turned off. Resistor 116 will therefore have no voltage drop across it, and P-Channel device 114 will be turned off.

If P-Channel device 114 is off and no current flows through resistor 120, that resistor will have no voltage drop across it. This assures that N-Channel device 106 is turned off, since its gate is connected to the node at which resistor 120 and N-Channel device are connected and its source-gate voltage will thus be zero.

If line 100 is equal to or negative with respect to line 102, N-Channel device 110 will turn on and the current flowing through it and resistor 116 will produce a gate-source voltage for P-Channel enhancement device 114 which will turn on that device. This will cause the voltage across resistor 120 to positively bias the source-gate of N-Channel device 106 and thus turn it on.

Devices such as N-Channel device 106 should always have their substrates connected to the most negative voltage in a circuit. Since, in the present invention, the source and drain of N-Channel device 106 are connected to lines 100 and 102 which change polarity once during each AC power cycle, N-Channel devices 122 and 124 serve to connect the substrate of N-Channel device 106 to whichever of lines 100 or 102 is the most negative at any given time.

With further reference to FIG. 2, N-Channel device 106 has its substrate connected to the common connection of the source of N-Channel device 122 and drain of N-Channel device 124 as well as both of their substrates. The drain of N-Channel device 122 is connected to line 100 and the source of N-Channel device 124 is connected to line 124.

When line 100 is positive with respect to line 102, N-Channel device 122 is off. Since the gate of N-Channel device 124 is more positive than its source, it is on and the substrates of devices 106, 122 and 124 are connected to line 102, the most negative voltage in the circuit.

If line 102 is more positive than line 100, P-Channel enhancement devices 114 is turned on as previously described, causing current flow in resistor 120. In addition to N-Channel device being turned on, N-Channel device 124 will be turned off since line 100 is negative with respect to line 102. Therefore the substrates of devices 106, 122 and 124 are connected to line 100, the most negative voltage in the circuit.

Figure 3:
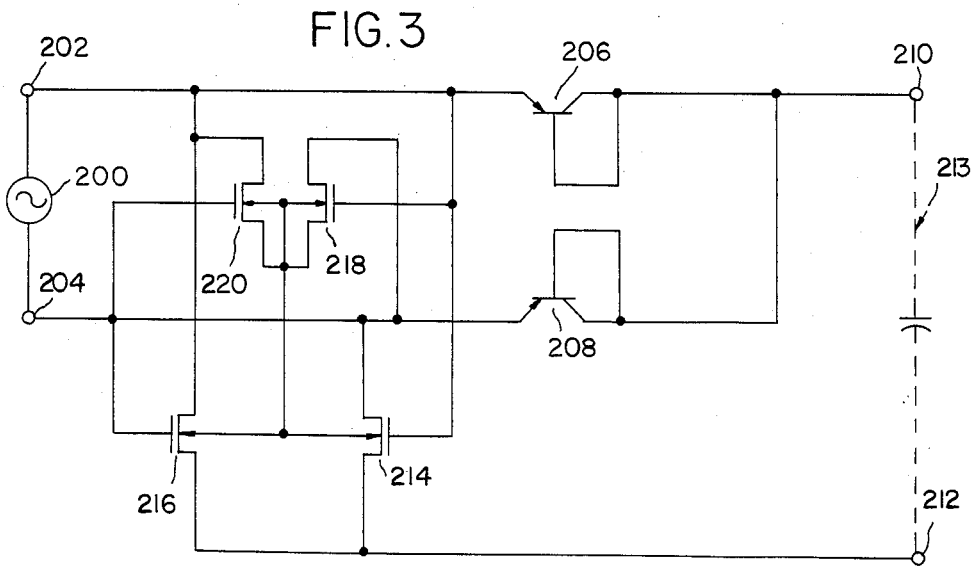
FIG. 3 is a schematic diagram of a preferred embodiment of a full-wave rectifier circuit used in the present invention.

Referring now to FIG. 3, a detailed schematic diagram of a preferred embodiment of a full-wave rectifier used in the present invention, source of AC power 200 is shown connected to AC input terminals 202 and 204 of the full-wave rectifier circuit of the present invention. When terminal 202 is positive with respect to terminal 204, current is conducted through PNP transistor 206, which has its collector and base connected together, and current passes to positive DC output terminal 210. After proceeding through the load (not shown) the current returns through negative DC terminal 212 and, switching device 214 back to AC input terminal 204. In a presently preferred embodiment, switching devices 214 and 216 are MOS N-Channel transistors. A filter capacitor 213 is shown in dashed lines at the output terminals of the circuit.

The gate of MOS N-Channel devices 214 is shown connected to AC input terminal 202. MOS N-Channel device 216 does not provide a return path to AC terminal 202; it is turned off since its gate is connected to AC input terminal 204. During this half cycle AC input terminal 202 is negative with respect to terminal 212, to which the source N-channel device 214 is connected. Since the gate of N-Channel device 214 s positive with respect to its source, it turns on.

During the AC half cycle when AC input terminal 204 is positive with respect to AC input terminal 202, current flows through PNP transistor 208, (its base connected to its collector like PNP transistor 206) through positive DC output terminal 210, and through the load (not shown). However, during this AC half cycle the return path from negative DC output terminal 212 to the AC power source is through N-Channel device 216 and AC input terminal 202.

The gate of N-Channel device 216 is connected to AC input terminal 204 which is more positive than AC input terminal 212 during this half cycle. The source of N-Channel device 216 is connected to negative DC output terminal 212. Likewise, N-Channel device 214 is off because its gate, connected to AC input terminal 202, is more negative than its source which is connected to AC terminal 212.

N-Channel devices 218 and 220 function to assure proper connection of the substrate terminals of the MOS devices. The drains of devices 218 and 220 are commonly connected to the substrates of devices 214, 216, 218 and 220. The source of device 218 is connected to AC input terminal 204 and the source of N-Channel device 220 is connected to AC input terminal 202.

During the half cycle when AC input terminal 202 is positive with respect to AC input terminal 204, the DC current return path from the load through from negative DC output terminal 212 will be through N-Channel device 214 and back to AC input terminal 204. During this half cycle, the most negative voltage in the circuit will be negative AC input terminal 294. During this half cycle the gate of N-Channel device 188, connected to AC input terminal 202, will be positive with respect to its source which is connected to AC input terminal 204. Therefore, N-Channel device 218 will conduct. N-Channel device 220, on the other hand, has its source connected to AC input terminal 202 and its gate connected to AC input terminal 204. Therefore, it will be turned off. The substrates of N-Channel devices 214, 216, 218 and 220 will be connected to AC input terminal 204, the most negative point in the circuit, during this half cycle.

When, however, AC input terminal 204 is more positive than AC input terminal 202, the current return path from negative DC output terminal 212 will be through N-Channel device 216 to AC input terminal 202. In this case, N-Channel device 220 turns on, since its gate is connected to AC input terminal 204 which is now more positive than its source connected to AC input terminal 202. The substrates of devices 214, 216, 218 and 220 will be connected to AC input terminal 202, the most negative voltage in the circuit during this half cycle. N-Channel device 218 will be turned off since its gate is connected to AC input terminal 202 which is more negative than AC input terminal 204 to which its source is connected.

Referring now to FIG. 4, a positive series pass regulator integrable on the same substrate as the rectifier portion of the circuit is disclosed, having positive input terminal 300, negative input terminal 302, positive output terminal 304 and negative output terminal 306. NPN series pass transistor 308 has its collector connected to positive input terminal 300 and its emitter connected to positive output terminal 304. Its base is connected to the junction of resistor 310 and zener diode 312. The other end of resistor 310 is connected to positive input terminal 300 and the other end of zener diode 312 is connected to the line between negative input terminal 302 and negative output terminal 306. The use of a circuit such as that shown in FIG. 4 is common in the industry and those of ordinary skill in the art will readily understand how it functions. In integrating such a circuit along with the other circuitry disclosed herein, it is noted that NPN pass transistor 308 may be fabricated in a P-well in a CMOS process as is readily understood by those skilled in the art.

Referring now to FIG. 5, a typical embodiment of a negative series pass regulator for use with the present is disclosed. Filtered direct current is supplied between positive input terminal 400 and negative input terminal 402 and regulated negative DC output is obtained between negative output terminal 404 and positive output terminal 406. As is apparent from FIG. 5, positive input terminal 400 is directly connected to positive output terminal 406. P-Channel series pass device 408 is connected between negative input terminal 402 and negative output terminal 404. As is readily understood by those of ordinary skill in the art, the network composed of resistor 410 and zener diode 412 establish the output voltage which appears between negative and positive output terminals 404 and 406. The operation of a circuit such as that depicted in 405 is straightforward and well understood by those of ordinary skill in the art, who will also readily understand how such a circuit may be fabricated as a part of a CMOS process.

Referring now to FIG. 6, an embodiment of a voltage regulator which may either have a fixed or a user selectable output is depicted. Input terminal 500 is connected to comparator circuit 502. Comparator circuit 502 consists of P-Channel device 504, N-Channel device 506, P-Channel device 508 and N-Channel device 510. N-Channel devices 506 and 510 are matched pairs and P-Channel devices 504 and 508 are almost matched pairs; P-Channel device 504 is sized to be slightly larger than P-Channel device 508.

Comparator 502 is fed by constant current source 512 consisting of P-Channel devices 514 and 516 and N-Channel device 518. The amount of current supplied by constant current source 512 is determined by the voltage which is placed, with respect to the negative DC supply voltage, on the gate of N-Channel device 518. A voltage reference source such as a zener diode and resistor combination, or a band gap reference will function satisfactorily as this voltage reference source as well as the other voltage reference source indicated at FIG. 6.

Comparator 502 functions as follows. Constant current source 512 supplies a constant total current to device 504 and 506 on one leg and device 508 and device 510 on the other leg of comparator 502. The current to both legs would be equal when the gate of P-Channel device 504 connected to input terminal 500 is at the negative supply voltage if these devices were matched. However, since device 504 is sized to be slightly larger than device 508, a slight unbalance is created allowing more current to flow through devices 504 and 506 than flows through devices 508 and 510. Therefore, the common connection of P-Channel device 508 and N-Channel device 510 will tend to be at a lower voltage than the common connection between P-Channel device 504 and N-Channel device 506. Therefore, the output of the comparator, the common junction between N-Channel device 510 and P-Channel device 508, is low and forces the input of inverter 520 to be low, and its output to be high.

If, however, the voltage at terminal 500, and therefore the voltage at the gate of P-Channel device 504, rises above the negative supply voltage, P-Channel device 504 tends to turn off. When it does so, the voltage at the commonly-connected gates of N-Channel devices 506 and 510 move towards the negative DC supply voltage, turning off those devices Therefore, the voltage at the output of the comparator rises and presents a high level to the input of inverter 520, thereby making its output low.

Inverter 520, connected to the output of comparator 502, consists of N-Channel device 522 and P-Channel device 524 which are connected in series, their gates connected together. If the input voltage to the gates is low, near or at the negative supply voltage, N-Channel device 522 will be off and P-Channel device 524 will be on. The output of inverter 520, the common source drain connection of devices 522 and 524, will thus be high. If the input is high, N-Channel device 522 will be on, P-Channel device 524 will be off, and the output will thus be low.

Switches 526 and 528 are composed of N-Channel device 530, P-Channel device 532 and N-Channel device 534 and P-Channel device 536, respectively. The gates of P-Channel device 532 and N-Channel device 534 are connected to the output of inverter 520. The gates of N-Channel device 530 and P-Channel device 536 are connected to the common connection between the output of comparator 502 and the input of inverter 520.

In the first case, in which the negative supply voltage is at terminal 500 (to choose the pre-defined characteristic) and thus forces the input to inverter 520 to be low and its output to be high, N-Channel device 530 connected to the input of the inverter and P-Channel device 532 connected to the output of the inverter will be turned on and N-Channel device 534 connected to the output of the inverter and P-Channel device 536 connected to the inverter will tend to be turned off. Switch 526 will be closed and switch 528 will be opened.

By similar reasoning when the input to inverter 520 is high and its output is low switch 528 will be closed and switch 526 will be opened.

Depending upon whichever one of switches 526 and 528 is closed, either the reference voltage (Vref) or the user-supplied voltage at input terminal 500 will be supplied to amplifier 538, configured as a source follower. The output of amplifier 538 is connected to output terminal 539 and presents an output voltage essentially equal to either the reference voltage (Vref) or the user-supplied voltage on input terminal 500.

Figure 7:
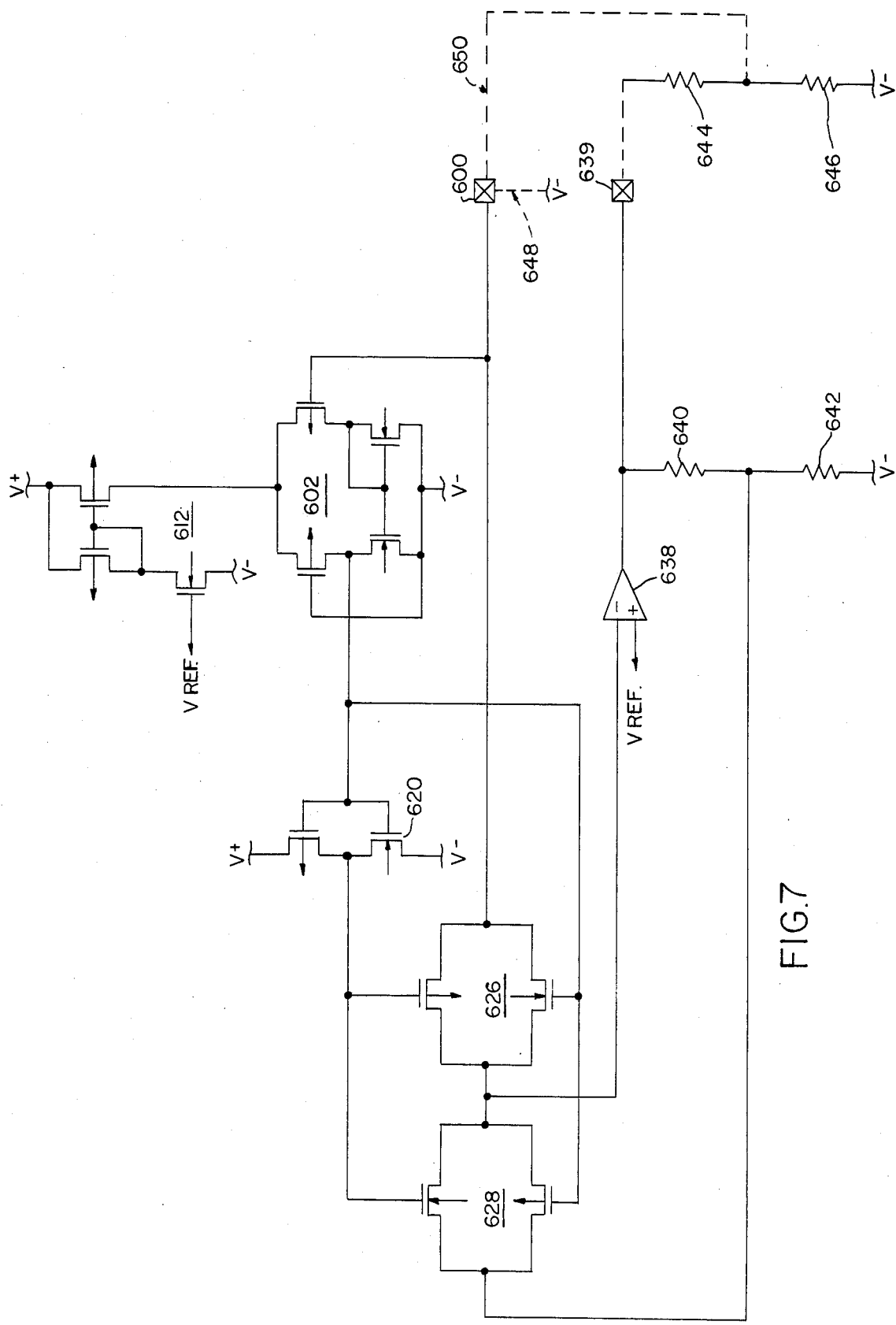
FIG. 7 is a schematic diagram of a preferred embodiment of a combination pre-set or user-selectable voltage regulator with feedback used with the present invention.

Referring now to FIG. 7, it will be observed by those of ordinary skill in the art that the embodiment shown therein is in most respects identical to the embodiment of FIG. 6. The connections between switches 626 and 628 and the buffer amplifier and output terminals are different, reflecting the use of feedback.

In the embodiment of FIG. 7, the principal of feedback is used to help stabilize and control the accuracy of the output. In this embodiment, a choice is made between the internal feedback loop consisting of resistor 640 and resistor 642, and a user-selectable external feedback loop consisting of resistors 644 and 646.

In embodiment of FIG. 7, the non-inverting input of amplifier 638 is connected to the reference voltage, supplied for example, by the zener diode resistor network 14 of FIGS. 1 and 2 of copending application Ser. No. 697,200, filed Jan. 31, 1985. The internal feedback loop consists of resistors 640 and 642, their common junction being connected to switch 628. The external feedback loop consists of resistors 644 and 646, their common junction being connected to switch 626 through the input terminal 600.

In the embodiment of FIG. 6, if the input terminal 600 is connected to the negative DC supply voltage, as indicated by dashed line 648, switch 628 will be closed and switch 626 will be open. Therefore, the internal feedback loop through amplifier 638 will be enabled and the voltage appearing at the output terminal 639 will be determined by ratio of the values of resistors 640 and 642, and the value of the reference voltage (Vref)

If, however, the input terminal 600 is connected to the junction of resistors 644 and 646 as shown by dashed line 150, switch 626 will be closed and switch 628 will be open, establishing the external feedback loop through amplifier 638. The voltage at output terminal 639 will therefore be determined by the ratio of the values of resistors 644 and 646 and the value of the reference voltage (Vref).

Thus, a power supply circuit has been disclosed herein which may be disposed on the same piece of semiconductor material as the circuit which it drives.

Those of ordinary skill in the art will recognize that, while the preferred CMOS embodiments described herein utilize N-Channel and P-Channel enhancement devices, other devices, such as depletion devices or bipolar function transistors could be utilized.

The circuit of the present invention may be easily fabricated as a CMOS embodiment employing well known CMOS processing steps and techniques. Conventional front end substrate processing techniques, masking steps, P well and active area doping steps, gate oxide formation, gate formation and contact and metallization steps may be employed. Such concepts, techniques and steps are well known in the art and will readily suggest themselves to one of ordinary skill in the art from an examination of the circuitry herein to be integrated.

Although the present preferred embodiment is a P well CMOS embodiment, those of ordinary skill in the art will readily understand how other technologies may be employed to fabricate structures according to the present invention.

What is claimed is:

1. A monolithically integrated power supply circuit, including:
    first and a second AC input terminals,
    half-wave rectifier means connected to said first and second AC input terminals for converting alternating current to direct current, said half-wave rectifier means having a diode-equivalent device connected between said first AC input terminal and a position filter capacitor terminal for passing current to said positive filter capacitor terminal when the voltage at said first input terminal is more positive than the voltage at said second input terminal, and further having active switching means connected between said first AC input terminal and said AC second input terminal for passing current from said second AC input terminal to said first AC input terminal when the voltage at said second AC input terminal is more positive than the voltage at said first AC input terminal,
    a negative filter capacitor terminal connected to said second AC input terminal, said positive and negative filter capacitor terminals for connecting an external filter capacitor therebetween,
    voltage regulator means having a positive input connected to said positive filter capacitor terminal, a positive output connected to a positive output terminal, and a negative terminal connected to said second input terminal.

2. The power supply circuit of claim 1 wherein said voltage regulator means include a series pass lateral PNP transistor having its collector connected to said positive filter capacitor terminal, its emitter connected to said positive output terminal, and its base connected to the anode end of a zener diode, and the cathode end of said zener diode connected to said negative terminal.

3. A monolithically integrated power supply circuit, including:
    first and second AC input terminals,
    half-wave rectifier means connected to said first and second AC input terminals for converting alternating current to direct current, said half-wave rectifier means having a diode-equivalent device connected between said first AC input terminal and a positive filter capacitor terminal for passing current to said positive filter capacitor terminal when the voltage at said first AC input terminal is more positive than the voltage at said second AC input terminal, and further having active switching means connected between said first AC input terminal and said second AC input terminal for passing current from said second AC input terminal to said first AC input terminal when the voltage at said second AC input terminal is more positive than the voltage at said first AC input terminal,
    a negative filter capacitor terminal connected to said second AC input terminal,
    negative voltage regulator means having a negative input connected to said negative filter capacitor terminal, a positive terminal connected to said a positive filter capacitor terminal, and a negative output terminal.

4. The power supply circuit of claim 3 wherein said negative voltage regulator means includes a P-channel MOS device having its drain connected to said negative input terminal, its source connected to said negative output terminal, its gate connected to the cathode end of a zener diode, the anode ned of said zener diode being connected to said positive input terminal.

5. A monolithically integrated power supply circuit, including:
    first and second AC input terminals,
    full-wave rectifier means connected to said first and second AC input terminals including two diode equivalent devices, one having its anode equivalent end connected to said first AC input terminal, the second one having its anode equivalent end connected to said second AC input terminal, said diode equivalent devices having their cathode equivalent ends connected together to a positive DC filter capacitor terminal,
    first switching means, connected between said first AC input terminal and a negative DC voltage output terminal, for selectively creating an open or closed circuit between said first AC input terminal and said negative DC voltage output terminal,
    second switching means connected between said second AC input terminal and said negative DC voltage output terminal, for selectively creating an open or closed circuit between said second AC input terminal and said negative DC voltage output terminal,
    comparing means for sensing whether the voltage on said first or said second AC input terminal is negative with respect to the other of said AC input terminals,
    switch control means, responsive to said comparing means, for closing the one of said first or second switching means which is connected to the one of said first and second AC input terminals which has a negative voltage on it with respect to the other of said AC input terminals, and for opening the other of said switching means,
    a negative filter capacitor terminal electrically common to said negative DC output terminal, and
    voltage regulator means having a positive input connected to said positive filter capacitor terminal, a positive output connected to a positive output terminal, and a negative terminal common to both its input and output and connected to said negative DC filter capacitor terminal.

6. The power supply circuit of claim 5 wherein said voltage regulator means includes a series pass lateral PNP transistor having its collector connected to said positive filter capacitor terminal, its emitter connected to said positive output terminal, and its base connected to the anode end of a zener diode, and the cathode end of said zener diode connected to said negative terminal.

7. A monolithically integrated power supply circuit, including:
  first and second AC input terminals,
  full-wave rectifier means connected to said first and second AC input terminals including two diode equivalent devices, one having its anode equivalent end connected to said first AC input terminal, the second one having its anode equivalent end connected to said second AC input terminal, said diode equivalent devices having their cathode equivalent ends connected together to a positive DC filter capacitor terminal,
  first switching means, connected between said first AC input terminal and a negative DC voltage output terminal, for selectively creating an open or closed circuit between said first AC input terminal and said negative DC voltage output terminal,
  second switching means connected between said second AC input terminal and said negative DC voltage output terminal, for selectively creating an open or closed circuit between said second AC input terminal and said negative DC voltage output terminal,
  a negative filter capacitor terminal connected to said second AC input terminal, said positive and negative filter capacitor terminals for connecting an external filter capacitor therebetween,
  negative voltage regulator means having a negative input connected to said negative filter capacitor terminal, a positive terminal connected to said positive filter capacitor terminal, and a negative output terminal.

8. The power supply circuit of claim 7 wherein said negative voltage regulator means includes a P-channel MOS device having its drain connected to said negative input terminal, its source connected to said negative output terminal, its gate connected to the cathode end of a zener diode, the anode end of said zener diode being connected to said positive input terminal.

9. A monolithically integrated power supply circuit, including:
  first and second AC input terminals,
  full-wave rectifier means connected to said first and second AC input terminals including first and second diode equivalent devices, said first diode equivalent device having its anode equivalent end connected to said first AC input terminal, said second diode equivalent device having its anode equivalent end connected to said second AC input terminal, said diode equivalent devices having their cathode equivalent ends connected together to a positive DC filter capacitor terminal,
  a first switching device connected between said second AC input terminal and a negative DC output terminal,
  a second switching device connected between said second AC input terminal and said negative DC output terminal,
  comparing means for sensing whether said first or said second AC input terminal is negative with respect to the other,
  switch control means, responsive to said comparing means, for closing the one of said first or second switching devices which is connected to the one of said first and second AC input terminals which has a negative voltage on it with respect to the other of said AC input terminals,
  voltage regulator means, having a positive input connected to said positive filter capacitor terminal, a positive output connected to a positive output terminal, and a negative terminal connected to said second input terminal.

10. The monolithically integrated power supply circuit of claim 9 wherein said first diode equivalent device is a series pass lateral PNP transistor having its emitter connected to said first AC input terminal, and its base and collector connected to said positive filter capacitor terminal, and said second diode equivalent device is a series pass lateral PNP transistor having its emitter connected to said second AC input terminal and its base and collector connected to said positive filter capacitor terminal.

* * * * *